(12) United States Patent
Chee et al.

(10) Patent No.: US 6,256,173 B1
(45) Date of Patent: Jul. 3, 2001

(54) APPARATUS FOR ISOLATING VIBRATION IN PIVOT BEARING ASSEMBLIES

(75) Inventors: Wai Onn Chee; Joseph Heng Tung Lau; Michael Joo Chiang Toh; Xiong Liu, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/330,420

(22) Filed: Jun. 11, 1999

Related U.S. Application Data

(60) Provisional application No. 60/089,007, filed on Jun. 11, 1999.

(51) Int. Cl.[7] .................................................. G11B 5/55
(52) U.S. Cl. ...................................... 360/265.7; 360/265.6
(58) Field of Search ............................... 360/265.2, 265.4, 360/265.6, 265.7

(56) References Cited

U.S. PATENT DOCUMENTS

| | | | | |
|---|---|---|---|---|
| 5,627,702 | * | 5/1997 | Kelemen et al. | 360/106 |
| 5,666,242 | * | 9/1997 | Edwards et al. | 360/106 |

* cited by examiner

*Primary Examiner*—Robert S. Tupper
(74) *Attorney, Agent, or Firm*—Merchant & Gould P.C.

(57) ABSTRACT

An apparatus for isolating vibration in pivot bearing assemblies that is incorporated in a standard pivot bearing assembly without requiring modification of the pivot bearing assembly. Washers are used between the pivot bearing assembly and the base plate of a disc drive upon which the assembly is mounted. In addition, a second washer is positioned on the shaft of the assembly and is held in place by a shoulder screw which fastens the assembly to the base plate.

18 Claims, 4 Drawing Sheets

APPARATUS FOR ISOLATING VIBRATION IN PIVOT BEARING ASSEMBLIES

RELATED APPLICATIONS

This application claims the benefit of provisional application Ser. No. 60/089,007 entitled "Vibration Isolation in Pivot Bearing Cartridges" filed Jun. 11, 1998.

FIELD OF THE INVENTION

The present invention relates generally to a disk drive system. More particularly, the present invention relates to an apparatus for isolating vibration that occurs in the pivot bearing assembly of a disk drive.

BACKGROUND OF THE INVENTION

In a contemporary hard disc drive, a pivot bearing assembly provides for rotatably supporting a head stack assembly within a head disc assembly so that each transducer head incorporated within the head stack assembly can be swung into a desired position relative to a respective recording surface of a disc. The head stack assembly typically includes an actuator body portion surrounding a bore opening, a voice coil motor portion, and a set of head gimbal assemblies each carrying at least one transducer head for reading and writing on the recording surface. The actuator body portion of the head stack assembly is typically attached to the pivot bearing assembly by inserting the pivot bearing assembly into the bore of the actuator body portion.

A conventional pivot bearing assembly comprises a shaft that is fixed to the base of the enclosure for the head disc assembly. The conventional pivot bearing assembly also includes at least two sets of bearings, and an outer sleeve. Each set of bearings generally has an inner race, an outer race, and ball bearings between the inner and outer races. An inner surface of each inner race abuts a portion of an outer cylindrical surface of the shaft. An outer surface of each outer race abuts a portion of an inner cylindrical surface of the outer sleeve. As installed within the head disc assembly, the outer surface of the cylindrical sleeve abuts the interior cylindrical surface of the bore of the actuator body. As a result, the actuator body portion is able to rotate about the fixed shaft of the pivot bearing assembly.

A contemporary disc drive needs to meet exacting standards with respect to the speed with which data can be accessed. These exacting standards involve high speed seek operations during which the head stack assembly receives high torque for angular acceleration to depart from a starting track and ramp up to a high angular velocity, then receives high torque for angular deceleration to ramp down the angular velocity and bring the active transducer head to a stable position at a target track for track following.

During such high speed seek operations, various structures involved in supporting the transducer heads can vibrate in a manner characterized by at least one resonant frequency. So long as the active transducer head is vibrating by a sufficient amount after the deceleration torque is removed, the drive cannot begin writing to or reading from the target track. Also, the vibrations propagate from the head stack assembly through the pivot bearing assembly and into a base plate and cover causing increased acoustical noise.

One source of such vibrations involves the ball bearings within the pivot bearing assembly. The ball bearings are characterized as having a finite radial stiffness. The existence of such finite radial stiffness, and particularly the tolerances associated with it (both initial tolerances and variations resulting from wear of the bearings), pose problems in disc drive designs.

A traditional approach to damping vibrations that occur in a pivot bearing assembly is to use O-rings that are compressed between portions of the pivot bearing assembly. For example, U.S. Pat. No. 5,727,882 describes a prior art approach of compressing a first O-ring between a cap portion and an inner sleeve and a second O-ring between the inner sleeve and the fixed shaft of the pivot bearing assembly. U.S. Pat. No. 5,666,242 discloses similar elastomeric interfaces.

A disadvantage of such a technique is that the damping provided by the O-rings is tolerance dependent and hence is not consistent among a common lot of O-rings. Therefore, when slight manufacturing differences exist among a common lot of O-rings, the damping provided by the O-rings changes.

U.S. Pat. No. 5,727,882 discloses alternative techniques for damping vibrations in pivot bearing assemblies. In particular, a channel is formed in the sleeve that surrounds the shaft. The channel contains a cured cast-in-place material that dampens vibratory waves propagating between of the sleeve and the shaft. Alternatively, the channel can be located between the shaft and the set of bearings. The channel is formed by cutting the sleeve. In another embodiment shown in FIG. 4 of the '882 patent, the shaft has ring shaped channels and the cured material must be post processed, i.e., trimmed of excess material.

Such a technique, however, has the disadvantage of requiring additional manufacturing steps such as creating the channel and curing the cast-in-place material.

U.S. Pat. No. 5,675,456 discloses an acoustic vibration decoupler for decoupling acoustic actuator vibrations in an actuator pivot bearing assembly. The vibration isolator includes an inner and outer member coupled by a plurality of pliable elements. The isolator is preferably fabricated as a single injection molded piece. U.S. Pat. No. 5,491,598 discloses a rotary actuator vibration damper. Damping material is coupled to the inner surface of the sleeve and an auxiliary member is coupled to the opposite surface of the damping material.

These techniques suffer from several disadvantages. First they typically require more manufacturing and/or assembly steps than the assembly of a pivot bearing without any damping capabilities. These additional steps increase the time needed to manufacture and/or assemble the pivot bearing assembly with such damping capabilities. In addition, the increase in manufacturing and/or assembly time results in an increase in the cost of pivot bearing assembly with such damping.

Therefore, there is a need for a cost effective and simple vibration damping technique that will adequately isolate vibrations without increasing the time and cost of manufacturing and assembling a pivot bearing assembly with such vibration isolation.

The present invention provides a solution to the above and other problems and offers the above and other advantages over the prior art.

SUMMARY OF THE INVENTION

The present invention relates to a disk drive which solves the above-mentioned problems and offers the above mentioned advantages. More particularly, the present invention relates to an apparatus for isolating vibration in the pivot bearing assemblies of a disc drive.

In accordance with one embodiment of the present invention there is provided an actuator system for moving a head gimbal assembly relative to a disc in a disc drive. The actuator system includes a drive controller and a stacked actuator assembly. The drive controller provides a driving force to the stacked actuator assembly. The head gimbal assembly is moved relative to the disc in response to the driving force provided by the drive controller. The stacked actuator assembly includes a shaft that has an outer surface. The shaft generally defines an axis of rotation. The shaft is mountable on a base plate of the disc drive. A sleeve is disposed about the outer surface of the shaft and an actuator arm assembly is coupled to the sleeve for rotation with the sleeve. The actuator arm supports the head gimbal assembly. A first vibration isolator is located between the base plate of the disc drive and a lower surface of the shaft.

According to a second embodiment of the present invention there is provided an actuator assembly for supporting a head gimbal assembly in a disc drive. The actuator assembly includes a base plate, a shaft, a sleeve, a bearing and a first vibration isolator. The shaft has an exterior surface and the sleeve has an inner surface and is disposed about the shaft such that the inner surface generally faces the exterior surface of the shaft. The bearing is disposed about the exterior surface of the shaft and rotatably mounts the sleeve to the shaft. The first vibration isolator is located between the base plate of the disc drive and a lower surface of the shaft.

According to a third embodiment of the present invention there is provided a pivot bearing assembly for supporting an actuator arm assembly of a disc drive. The pivot bearing assembly includes a shaft that generally defines an axis. The shaft has a lower surface that is generally annular in shape. A sleeve is rotatably mounted about the shaft and a first vibration isolator disposed on the lower surface of the shaft.

According to a fourth embodiment of the present invention there is provided a pivot bearing assembly for mounting to an enclosure of a disc drive to support an actuator arm assembly of the disc drive. The pivot bearing assembly includes a shaft affixed to the enclosure. The shaft defines a longitudinal axis. A first set of bearings and a second set of bearings are longitudinally spaced from each other and each set of bearings surrounds a respective portion of the shaft. A sleeve defines an inner sleeve surface and an outer sleeve surface. The inner sleeve surface has longitudinally spaced-apart cylindrical portions abutting the first and second sets of bearings. The outer sleeve surface is cylindrical in shape in order to mate with a portion of the actuator arm. A first vibration isolator disposed between the enclosure of the disc drive and a lower surface of the shaft.

The present invention provides a cost effective method of vibration isolation. The present vibration isolation technique reduces the complexity of manufacture and assembly of a pivot bearing assembly with vibration isolation, thus improving the production yield.

Another advantage of the present invention is that the time and cost to produce and assemble a pivot bearing assembly with such vibration isolation are reduced considerably because additional parts do not have to be added internally to the pivot bearing assembly as in the prior art techniques. In addition, the parts of the pivot bearing assembly do not have to be manufactured differently in order to accommodate the vibration isolation technique of the preferred embodiments of the present invention.

These and various other features as well as advantages which characterize the present invention will be apparent upon reading of the following detailed description and review of the associated drawings.

DETAILED DESCRIPTION

Figure 1:
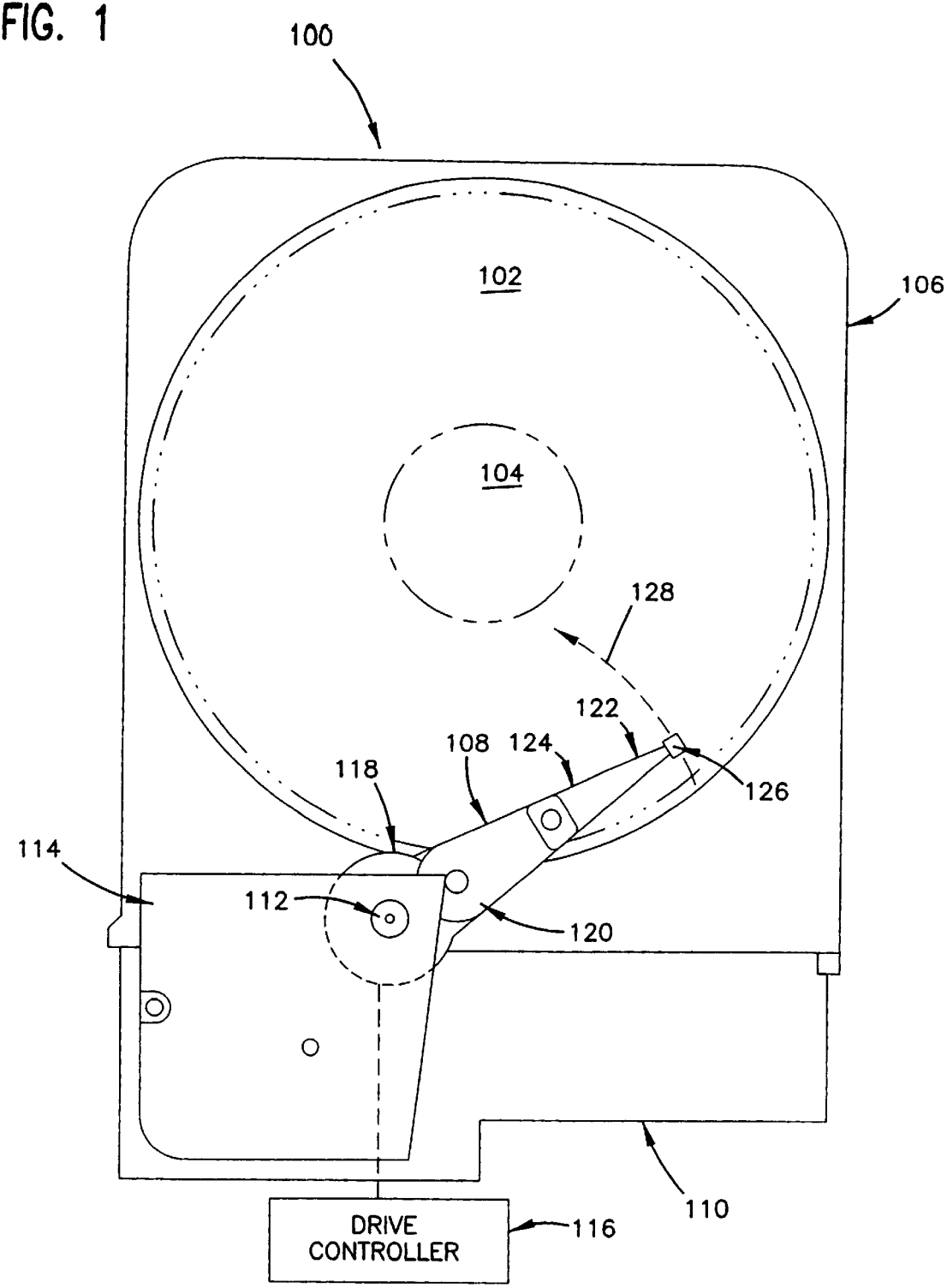
FIG. 1 is a top view of a disc drive.

FIG. 1 is a top view of a disc drive 100. Disc drive 100 includes a magnetic disc 102 mounted for rotational movement about an axis defined by spindle 104 within housing 106. Disc drive 100 also includes a stacked actuator system 108 mounted to a base plate 110 of the housing 106 and pivotally movable relative to disc 102 about axis 112. A cover 114 covers a portion of stacked actuator system 108. Drive controller 116 is coupled to stacked actuator system 108. In a preferred embodiment, drive controller 116 is either mountable within disc drive 100 or is located outside of disc drive 100 with suitable connection to stacked actuator system 108.

In a preferred embodiment, stacked actuator system 108 includes an actuator arm assembly 118, a rigid support member 120, and a head gimbal assembly 122. Head gimbal assembly 122 includes a load beam or flexure arm 124 coupled to rigid member 120, and a slider 126 coupled by a gimbal (not shown) to load beam 124. Slider 126 supports a transducer for reading information from disc 102 and encoding information on disc 102.

During operation, drive controller 116 receives position information indicating a portion of disc 102 to be accessed. Drive controller 116 receives the position information from the operator, from a host computer or from another suitable controller. Based on the position information, drive controller 116 provides a position signal to stacked actuator system 108. The position signal causes stacked actuator system 108 to pivot or rotate about axis 112. This, in turn, causes slider 126 and the transducers mounted on slider to move radially over the surface of the disc 102 in a generally arcuate path as indicated by arrow 128. Once the transducer is properly positioned, drive controller 116 then executes a desired read or write operation.

Figure 2:
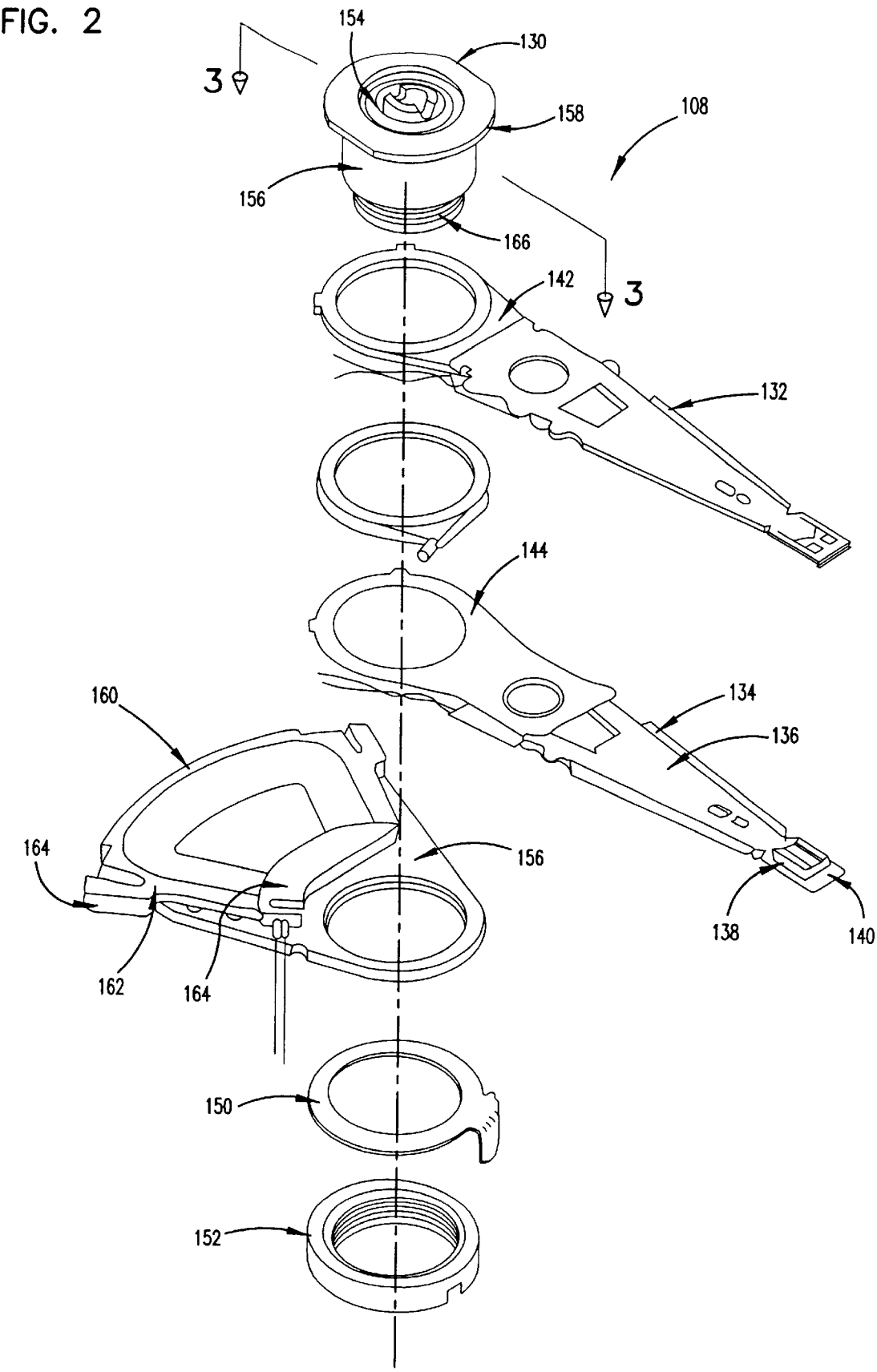
FIG. 2 is an exploded view of a stacked actuator system.

FIG. 2 is an exploded view of the stacked actuator assembly 108 shown in FIG. 1. The particular stacked actuator system 108 shown in FIG. 2 is used in a disc drive having one disc. Of course, those of ordinary skill in the art will appreciate that the stacked actuator assembly can be designed to accommodate disc drives having more than one disc and the present invention is not limited to the particular configuration illustrated. Stacked actuator system 108 includes pivot bearing assembly 130, a plurality of head gimbal assemblies 132, 134 each including a load beam 136, a gimbal (not shown), a slider 138 and a transducer 140. Each of the head gimbal assemblies is coupled to a support member 142, 144.

Each of the head gimbal assemblies 132, 134 also has conductors (not shown) coupled within a conductor sleeve (not shown) and connected to transducer 140. The conductors are coupled to appropriate signal conditioning circuitry and the conditioned signals are provided to drive controller 116. Stacked actuator system 108 also includes a spacer 146 that is coupled between support members 142, 144. Stacked actuator system 108 also includes actuator arm assembly 118, a hook ring 150 and a nut ring 152.

The pivot bearing assembly 130 includes a shaft 154 and a sleeve 156. The exterior surface of the shaft 154 and the interior surface of the sleeve 156 are mounted to bearing races (not shown) which are separated by ball bearings (not shown). In a preferred embodiment two sets of bearing races, axially spaced from one another along shaft 154, are provided with ball bearings. Sleeve 156 includes a flange 158 which is disposed annularly about an upper portion of sleeve 156.

During assembly, all of the parts that form the stacked actuator assembly 108 are placed over sleeve 156 to abut flange 158 in the order shown in FIG. 2. Nut ring 152 has a threaded interior surface that threadably mates with a threaded exterior end portion 160 of sleeve 156. After all of the items of the stacked actuator system 108 are placed onto sleeve 156, nut ring 152 threadably engages the threaded exterior end portion 160 of the sleeve 156 to secure the parts of the system 108 together.

FIG. 2 shows that actuator arm assembly 118 includes an actuator arm 156, a voice coil 164, an overmold 162, and a spacer 164. Cables 168, 170 are connected to voice coil 166 and to drive controller 116 to control movement of the system 108 as is well known to those of ordinary skill in the art.

Figure 3:
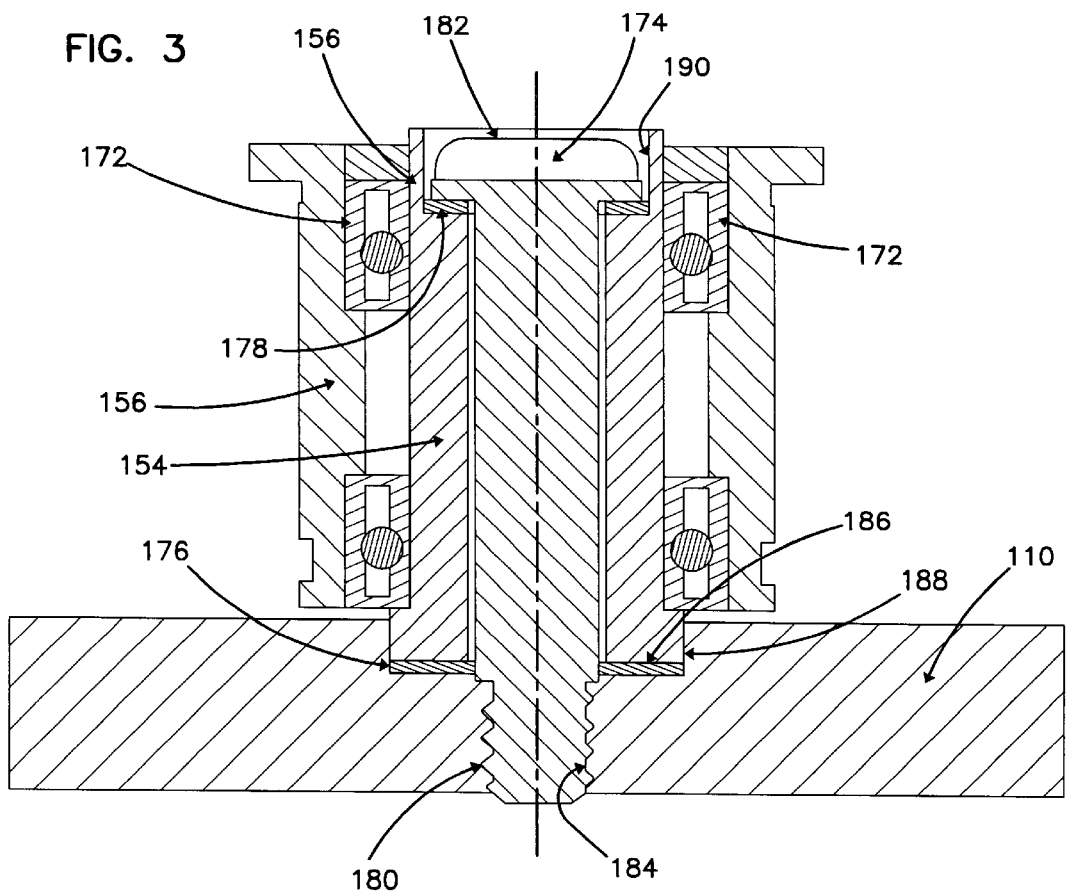
FIG. 3 is a cross-sectional view of a pivot bearing assembly according to a preferred embodiment of the present invention.
Figure 4:
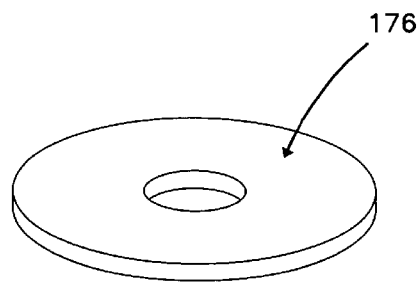
FIG. 4 is a perspective view of a vibration isolator in accordance with a preferred embodiment of the present invention.

FIG. 3 is a cross-sectional view of a pivot bearing assembly 130 according to a preferred embodiment of the present invention. The pivot bearing assembly 130 is shown mounted to a base plate 110 of the actuator system housing (not shown). The pivot bearing assembly 130 includes shaft 154, a sleeve 156, two sets of ball bearings 172, a shoulder screw 174, a first vibration isolator 176 and a second vibration isolator 178. The sets of bearings 172, as previously described, rotatably couple the sleeve 156 to the shaft 154. The shaft 154 has a cylindrical bore 182 formed therein for receiving the shoulder screw 174. The shoulder screw 174 has at one end threads 184 that engage the threaded bore 180 in the base plate 110 so that the pivot bearing assembly 130 can be securely mounted on the base plate 110. The base plate 110 has a threaded bore 180 which receives the shoulder screw 174 for securing the pivot bearing assembly 130 to the base plate 110. The shaft 154 has a lower surface 186 that is preferably annular in shape. This lower surface 186 fits in a depression 188 formed in the base plate 110 as seen. The first vibration isolator 176 is disposed on the lower surface 186 of the shaft 154 and preferably also has an annular shape. In a most preferred embodiment the first vibration isolator 176 is a washer as seen in FIG. 4. When the pivot bearing assembly 130 is mounted to the base plate 110 the first vibration isolator 176 is disposed between the base plate 110 and the lower surface 186 of the shaft 154. The upper portion of the shaft 156 has a upper surface 190 that is preferably annular in shape. The second vibration isolator 178 is disposed on this upper surface 190 of the shaft 156. In a preferred embodiment the second vibration isolator is annular in shape and most preferably is similar to the first vibration isolator 176 as seen in FIG. 4, however, its width is different as can be seen from FIG. 3. When the shoulder screw 174 is disposed in the cylindrical bore 182 of the shaft 156, the first and second vibration isolators 176, 178 are compressed between the shaft 156 and the base plate 110 and the shaft 156 and the shoulder screw 174 respectively. Compression of the first and second vibration isolators is controlled by the adjustment of the shoulder screw 174.

In a preferred embodiment, the first and second vibration isolators 176, 178 are made of an elastomeric material. As will be described later, the hardness of the first and second vibration isolators 176, 178 may range from about 50 Shore A to about 70 Shore A depending upon the requirements of the disc drive designer. In a preferred embodiment the first and second vibration isolators 176, 178 have a uniform thickness.

Because the first and second vibration isolators 176, 178 fit on the exterior of the pivot bearing assembly 130, they allow vibration damping to be incorporated in the pivot bearing assembly 130 without requiring any special machining or configuration of the parts of the pivot bearing assembly. In addition, the assembly of the pivot bearing assembly 130 with the first and second vibration isolators 176, 178 is simple. Before the pivot bearing assembly 130 is mounted on the base plate 110, the first vibration isolator 176 is positioned in the depression 188 in the base plate 110. The pivot bearing assembly 130 is then conventionally positioned and before the shoulder screw 174 is inserted into the cylindrical bore 182 of the shaft 154, the second vibration isolator 178 is positioned on the upper surface 190 of the shaft 154. The shoulder screw 174 can then be inserted and tightened to not only attach the pivot bearing assembly 130 to the base plate 110 but also compress the first and second vibration isolators 176, 178 by the proper amount.

Figure 5:
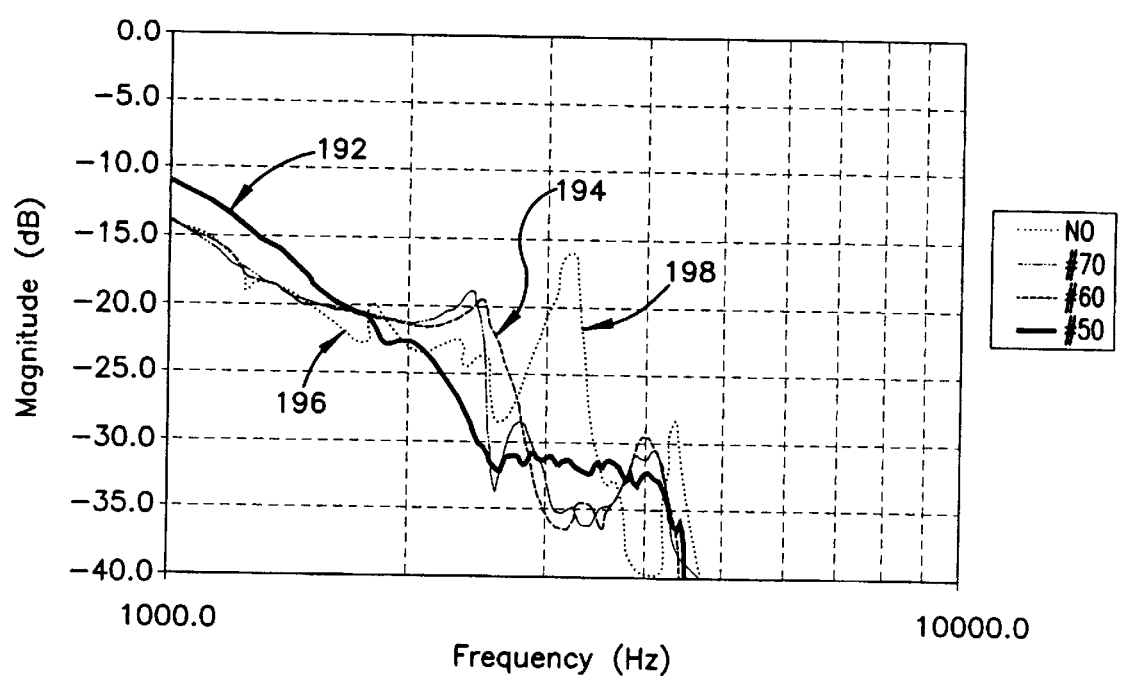
FIG. 5 is a pure mechanical Bode plot of frequency responses of an actuator arm having pivot bearing assemblies incorporating vibration isolators having different damping hardnesses according to preferred embodiments of the present invention and a pivot bearing assembly without vibration isolators.

FIG. 5 is a pure mechanical Bode plot of frequency responses of an actuator arm having pivot bearing assemblies incorporating vibration isolators having different damping hardnesses according to preferred embodiments of the present invention and a pivot bearing assembly without vibration isolators. The horizontal axis has frequency plotted in Hertz and the vertical axis has magnitude plotted in decibels. Different responses were achieved using vibration isolators of different hardness. Three different hardnesses were tested and plotted, namely 50, 60 and 70 Shore A as shown in graphs 192, 194 and 196 respectively. Also, a pivot bearing assembly without any vibration isolators was also plotted as shown in graph 198. It can be seen from the plots that four different resonance frequencies were affected by incorporating the vibration isolators according to the present invention. It can be seen that the magnitude of the resonance at 1.2 and 1.8 kHz was reduced. There was also an improvement in phase. The magnitude at 3.2 kHz dropped about 19 dB and the magnitude at 2.4 kHz increased about 3 dB for vibration isolators having a hardness of 60 and 70 Shore A.

Overall, vibration isolators having a hardness of 50 Shore A had the largest effect in that obvious resonance peaks were not observed, overall phase improved by 30° and low frequency gain dropped about 2 dB.

By manipulating the hardness of the vibration isolators, the frequency response may be modified to suit different disc drive designer servo requirements.

One of the advantages of the present invention over other designs is that it is simple to assemble and does not require any modifications of a conventional pivot bearing assembly. Another advantage is that the present invention achieves vibration isolation by adding only two components to the exterior of a conventional pivot bearing assembly. Furthermore, resonances are effectively dampened which leads to a reduction is acoustic resonance as well as improved performance of the activator arm assembly during seek operations.

In summary, the present invention is directed to a pivot bearing assembly having vibration isolation. In accordance with one embodiment of the present invention there is provided an actuator system 108 for moving a head gimbal assembly 122 relative to a disc 102 in a disc drive 100. The actuator system 108 includes a drive controller 116 providing a driving force, a stacked actuator assembly 118 movable by the drive controller 116 and coupled to the head gimbal assembly 122 for moving the head gimbal assembly 122 relative to the disc 102 in response to the driving force provided by the drive controller 116. The stacked actuator assembly 118 includes a shaft 154 having an outer surface, the shaft 154 generally defining an axis of rotation 112 wherein the shaft 154 is mountable on a base plate 110 of the disc drive 100, a sleeve 156 disposed about the outer surface of the shaft 154, an actuator arm assembly 118 coupled to the sleeve 156 for rotation with the sleeve 156 and for supporting the head gimbal assembly 122, and a first vibration isolator 176 located between the base plate 110 of the disc drive 100 and a lower surface 186 of the shaft 154. According to a second embodiment of the present invention there is provided an actuator assembly 108 for supporting a head gimbal assembly 122 in a disc drive 100. The actuator assembly 108 includes a base plate 110, a shaft 154 having an exterior surface, a sleeve 156 having an inner surface and disposed about the shaft 154 such that the inner surface generally faces the exterior surface of the shaft 154, a bearing 172 disposed about the exterior surface of the shaft 154 and rotatably mounting the sleeve 156 to the shaft 154, and a first vibration isolator 176 located between the base plate 110 of the disc drive 100 and a lower surface 186 of the shaft 154. According to a third embodiment of the present invention there is provided a pivot bearing assembly 130 for supporting an actuator arm assembly 118 of a disc drive for rotation about an axis 112. The pivot bearing assembly 130 includes a shaft 154 generally defining the axis 112, the shaft 154 having a lower surface 186 that is generally annular in shape, a sleeve 156 rotatably mounted about the shaft 154, and a first vibration isolator 176 disposed on the lower surface 186 of the shaft 154. According to a fourth embodiment of the present invention there is provided a pivot bearing assembly 130 for mounting to an enclosure of a disc drive 100 to support an actuator arm assembly 118 of the disc drive 100. The pivot bearing assembly 130 includes a shaft 154 affixed to the enclosure and defining a longitudinal axis 112, a first set of bearings 172, a second set of bearings 172 longitudinally spaced from the first set of bearings each set of bearings surrounding a respective portion of the shaft 154, a sleeve 156 defining an inner sleeve surface and an outer sleeve surface, the inner sleeve surface having longitudinally spaced-apart cylindrical portions abutting the first and second sets of bearings 172, the outer sleeve surface being cylindrical to mate with a portion of the actuator arm, and a first vibration isolator 176 disposed between the enclosure of the disc drive and a lower surface of the shaft.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application of the apparatus for isolating vibration while maintaining substantially the same functionality without departing from the scope and spirit of the present invention. In addition, although the preferred embodiment described herein is directed to vibration isolation for pivot bearing assembly, it will be appreciated by those skilled in the art that the teachings of the present invention can be applied to other assemblies like the activator arm assembly, for example, without departing from the scope and spirit of the present invention.

What is claimed is:

1. A pivot bearing assembly for supporting an actuator arm assembly of a disc drive for rotation about an axis, the pivot bearing assembly comprising:

a shaft generally defining the axis, the shaft having a lower surface that is generally annular in shape;

a sleeve rotatably mounted about the shaft; and a first vibration isolator made of an elastomeric material wherein the first vibration isolator is a flat washer that has a surface that is in physical contact with the entire lower surface of the shaft.

2. The pivot bearing assembly of claim 1 further comprising a second vibration isolator disposed on an upper surface of the shaft wherein the upper surface of the shaft is designed to be engaged by a shoulder screw when the pivot bearing assembly is fastened to a base of the disc drive.

3. The pivot bearing assembly of claim 2 wherein the first and second vibration isolators are washers.

4. The pivot bearing assembly of claim 3 wherein the washers are made from an elastomeric material.

5. The pivot bearing assembly of claim 1 wherein the first vibration isolator is made of a material having a hardness ranging from about 50 Shore A to about 70 Shore A.

6. The pivot bearing assembly of claim 1 wherein the first vibration isolator is formed of a material having a hardness of about 50 Shore A.

7. The pivot bearing assembly of claim 1 further comprising a rotatable bearing mounted between the sleeve and the shaft.

8. An actuator assembly for supporting a head gimbal assembly in a disc drive, the actuator assembly comprising:

a base plate;

a shaft having an exterior surface;

a sleeve having an inner surface and disposed about the shaft such that the inner surface generally faces the exterior surface of the shaft;

a bearing disposed about the exterior surface of the shaft and rotatably mounting the sleeve to the shaft; and a first vibration isolator made of an elastomeric material located between the base plate of the disc drive and a lower surface of the shaft wherein the first vibration isolator is a flat washer that has a surface that is in physical contact with the entire lower surface of the shaft.

9. A disc drive comprising:

a base plate;

a head gimbal assembly;

a stacked actuator assembly mounted on the base plate and coupled to the head gimbal assembly;

a drive controller operatively coupled to the stacked actuator assembly wherein the drive assembly provides a driving force to the stacked actuator assembly to move the stacked actuator assembly;

wherein the stacked actuator assembly moves the head gimbal assembly relative to a disc in response to the driving force provided by the drive controller;

the stacked actuator assembly comprising:

a shaft having an outer surface, the shaft generally defining an axis of rotation wherein the shaft is mountable on a base plate of the disc drive;

a sleeve disposed about the outer surface of the shaft;

an actuator arm assembly coupled to the sleeve for rotation with the sleeve which supports the head gimbal assembly; and a first vibration isolator made of an elastomeric material located between the base plate of the disc drive and a lower surface of the shaft wherein the first vibration isolator is a flat washer that has a surface that is in physical contact with the entire lower surface of the shaft.

10. The actuator system according to claim 9 wherein the lower surface of the shaft is annular in shape and the first vibration isolator is a washer that fits on the lower surface of the shaft.

11. The actuator system of claim 9 further comprising a second vibration isolator disposed on an upper surface of the shaft wherein the upper surface of the shaft is designed to be engaged by a shoulder screw when the actuator assembly is fastened to a base plate of the disc drive.

12. The actuator system of claim 11 wherein the second vibration isolator comprises a washer.

13. The actuator system of claim 11 wherein the first and second vibration isolators are formed of a material having a hardness ranging form about 50 Shore A to about 70 Shore A.

14. The actuator system of claim 11 wherein the first and second vibration isolators are formed of a material having a hardness of about 50 Shore A.

15. A pivot bearing assembly for supporting an actuator arm assembly of a disc drive for rotation about an axis, the pivot bearing assembly comprising:

a shaft generally defining the axis, the shaft having a lower surface that is generally annular in shape;

a sleeve rotatably mounted about the shaft; and means for isolating vibration disposed on the lower surface of the shaft.

16. The pivot bearing assembly of claim 15 wherein the means for isolating vibration is a washer.

17. The pivot bearing assembly of claim 15 wherein the means for isolating vibration is made of an elastomeric material.

18. The pivot bearing assembly of claim 15 further comprising a second means for isolating vibration disposed on an upper surface of the shaft wherein the upper surface of the shaft is designed to be engaged by a shoulder screw when the pivot bearing assembly is fastened to a base of a disc drive.

\* \* \* \* \*